US007462067B1

(12) United States Patent
Whiteman, Jr. et al.

(10) Patent No.: US 7,462,067 B1
(45) Date of Patent: Dec. 9, 2008

(54) CABLE-TO-CABLE PANEL MOUNT POWER CONNECTOR

(75) Inventors: Robert Neil Whiteman, Jr., Middletown, PA (US); Christopher David Ritter, Hummelstown, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/890,878

(22) Filed: Aug. 8, 2007

(51) Int. Cl.
*H02B 1/01* (2006.01)

(52) U.S. Cl. ........................................ 439/562; 439/680

(58) Field of Classification Search ................. 439/527, 439/544, 552, 562–564, 569, 572–574, 677, 439/680

See application file for complete search history.

(56) References Cited

U.S. PATENT DOCUMENTS

| | | | | |
|---|---|---|---|---|
| 4,867,690 | A | 9/1989 | Thumma | |
| 5,176,528 | A | 1/1993 | Fry et al. | |
| 5,197,893 | A | 3/1993 | Morlion et al. | |
| 5,342,221 | A | 8/1994 | Peterson | |
| 5,586,915 | A | 12/1996 | Baker et al. | |
| 5,591,035 | A | 1/1997 | Burkholder et al. | |
| 5,595,509 | A | 1/1997 | Fry et al. | |
| 5,885,088 | A | 3/1999 | Brennan et al. | |
| 6,095,854 | A | 8/2000 | Sommer et al. | |
| 6,176,738 | B1 | 1/2001 | Consoli et al. | |
| 6,217,364 | B1 | 4/2001 | Miskin et al. | |
| 6,312,285 | B1 | 11/2001 | Berg et al. | |
| 6,641,420 | B2 * | 11/2003 | Blanchfield et al. | 439/247 |
| 6,676,453 | B1 * | 1/2004 | Rosset Rubio | 439/752 |
| 7,137,847 | B2 | 11/2006 | Trout et al. | |
| 7,168,978 | B1 | 1/2007 | Trout et al. | |
| 7,371,110 | B2 | 5/2008 | Murakami et al. | |
| 2006/0194473 | A1 | 8/2006 | Lange | |

* cited by examiner

*Primary Examiner*—Khiem Nguyen

(57) ABSTRACT

An electrical connector mountable to a panel includes a dielectric housing having a plurality of contact cavities extending from a mating end to a contact loading end and arranged in rows and columns. At least one of the plurality of contact cavities includes a polarizing contact cavity positioned and formed to define a mating connector. In one embodiment, the polarizing contact cavity is a corner contact cavity having a contact cavity wall with a slot formed therein. The slot is configured to receive a ridge on the mating connector. The slot may open into a guide receptacle. Alternatively, the polarizing contact cavity is a corner contact cavity and includes a contact cavity wall having a channel that extends into a side wall of the housing. The channel is configured to receive a protrusion on the mating connector.

20 Claims, 8 Drawing Sheets

CABLE-TO-CABLE PANEL MOUNT POWER CONNECTOR

BACKGROUND OF THE INVENTION

The invention relates generally to electrical connectors, and more specifically, to a cable-to-cable connector assembly for use with a power supply in an electronic device.

Some electronic devices, such as computers, include a power supply that provides power to components mounted on the motherboard and certain other peripheral devices such as fans, disk drives, CD and DVD drives, etc. Typically the power supply includes a wire harness that has a bundle of wires coming out of the power supply. The wires in the wiring harness typically are provided with a multiplicity of connectors, each designed to be connected to a particular type of peripheral device. The electronic device also has its own wiring harness that is compatible with the wiring harness in the power supply. Further, power supplies are designed to handle various maximum power levels or wattages with the power supplies rated at higher power levels having more circuits or more wires in the wiring harness As the number of electronic devices in the marketplace has increased, many with multiple versions, it has become burdensome for power supply manufacturers to provide multiple versions of power supplies and for device manufactures to carry an inventory of different harnesses based on multiple configurations of motherboards and peripherals in the devices. Cable-to-cable connector assemblies, wherein one connector is mounted on or in the power supply and a mating connector carries wiring for the device, have lessened these inventory carrying requirements.

Conventional cable-to-cable or cable-to-board connector assemblies typically include a receptacle connector and a plug connector. Contacts of the connectors are interconnected to one another during mating of the connectors. However, known connectors suffer from problems associated with the mating of the connectors. For example, the connectors typically require alignment and proper orientation of the receptacle connector and the plug connector for mating. Sometimes visibility or accessibility is limited, which makes it difficult for a user to align and orient the connectors.

Furthermore, greater numbers of contacts are being housed in each connector to accommodate higher power demands through the connectors. As a result, the connectors are more difficult to mate with one another because the mating force required to fully mate the connectors is increased. Improper mating of the connectors may lead to a partial or complete failure of the system operated by the connectors. To overcome these and other mating problems, at least some known connectors provide thumb screws on the receptacle connector that may be secured to the plug connector or chassis surrounding the plug connector. By tightening the thumb screws, the connectors become fully mated, and removal of the receptacle connector from the plug connector is restricted. However, other problems are associated with the use of such known thumb screws. Particularly, tightening and un-tightening the thumb screws is difficult and sometimes uncomfortable for the user. Additionally, tightening and un-tightening the thumb screws is time consuming.

A need remains for a cable-to-cable connector assembly that eliminates the need for a wiring harness in power supplies and in electronic devices. There is a further need for such a connector assembly that is convenient to use and may be mated with a reduced mating force.

BRIEF DESCRIPTION OF THE INVENTION

In one embodiment, an electrical connector mountable to a panel is provided. The connector includes a dielectric housing having a plurality of contact cavities extending from a mating end to a contact loading end and arranged in rows and columns. At least one of the plurality of contact cavities includes a polarizing contact cavity positioned and formed to define a mating connector.

Optionally, the polarizing contact cavity is a corner contact cavity and includes a contact cavity wall having a slot formed therein. The slot is configured to receive a ridge on the mating connector. The slot may open into a guide receptacle. Alternatively, the polarizing contact cavity is a corner contact cavity and includes a contact cavity wall having a channel that extends into a side wall of the housing. The channel is configured to receive a protrusion on the mating connector. The connector further includes contacts loaded into the contact cavities. Some of the contacts are positioned at a first seating depth from the mating end and others of the contacts are positioned at a second seating depth from the mating end that is different from the first seating depth.

In another embodiment, a connector assembly is provided that includes a first connector configured to be mounted to a panel. The connector includes a housing having a plurality of contact cavities extending from a mating end to a contact loading end and arranged in rows and columns. A second connector is matable to the first connector. The second connector includes a housing including a plurality of silos each having a contact cavity extending from a mating end to a contact loading end. Each silo is configured to be received in a respective one of the contact cavities in the first connector. At least one of the plurality of contact cavities in the first connector comprises a polarizing contact cavity configured to receive a complementary silo on the second connector to orient the first connector with respect to the second connector.

DETAILED DESCRIPTION OF THE INVENTION

Figure 1:
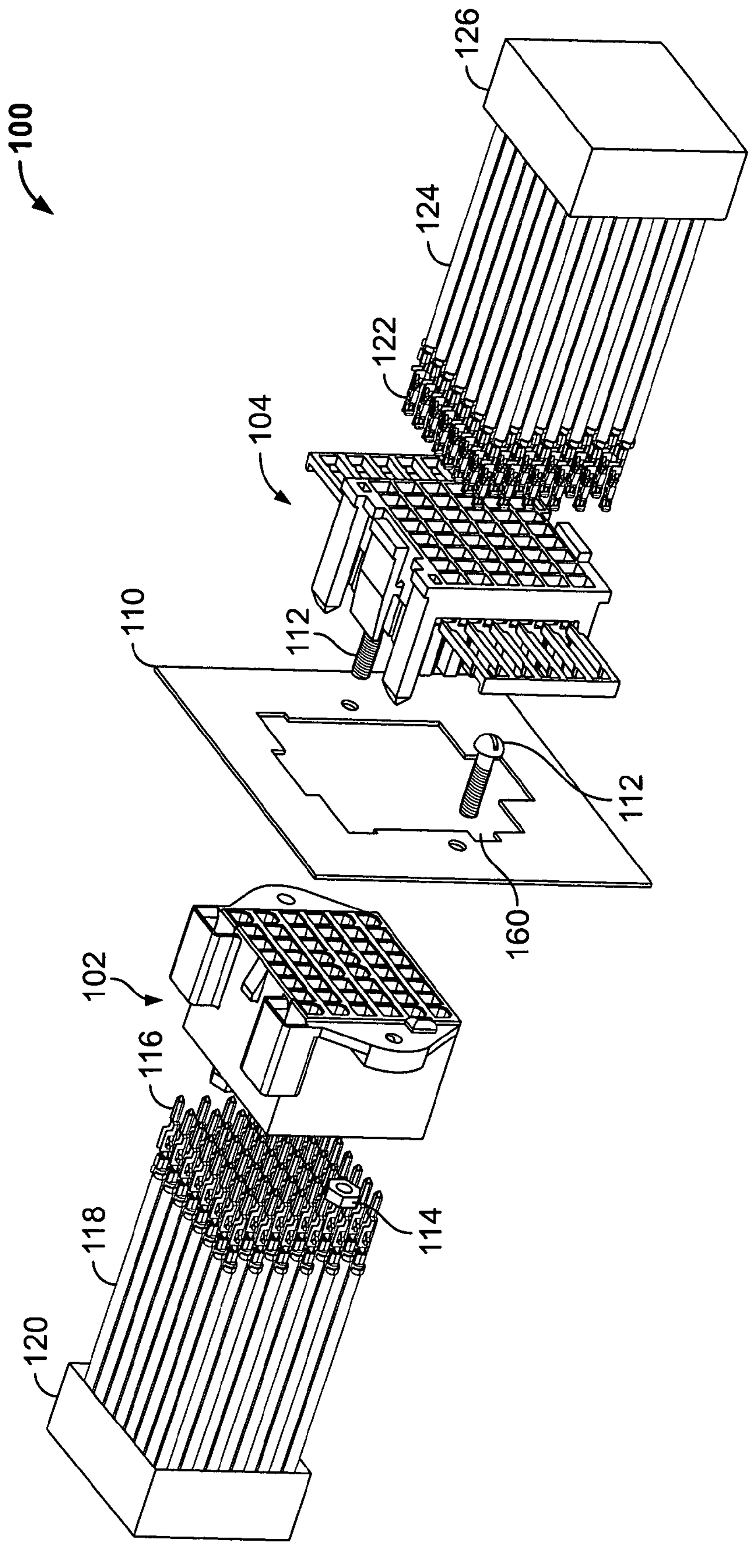
FIG. 1 is an exploded view of a connector assembly formed in accordance with an exemplary embodiment of the present invention.

FIG. 1 illustrates an exploded view of a connector assembly 100 formed in accordance with an exemplary embodiment of the present invention. The assembly 100 includes a plug connector 102 and a mating receptacle connector 104. As illustrated, the plug connector 102 is configured to be mounted to a panel, a backplane, chassis, or the like, generally represented at 110 using fasteners which, for example may be threaded screws 112 and nuts 114. Most generally, the plug connector 102 may hold contacts 116 that are terminated to wires 118 of a cable 120. Similarly, the receptacle connector 104 may hold contacts 122 that are terminated to wires 124 of a cable 126. As such, the assembly 100 generally defines a cable-to-cable connector assembly. Alternatively, the plug connector 102 may be terminated to an integrated circuit or circuit board (not shown). In the description that follows, the panel 110 may be referred to interchangeably as a panel or a chassis and reference will be made to the plug connector 102 as a power connector that is mounted to the chassis 110 of a power supply (not shown). As such, the wires 118 may represent multiple power circuits that are delivered from the power supply through the connector assembly 100 and then to circuits in an electrical device (not shown). It is to be understood, however, that this description represents but one application of the inventive concepts described herein and that no limitation is intended hereby.

Figure 2:
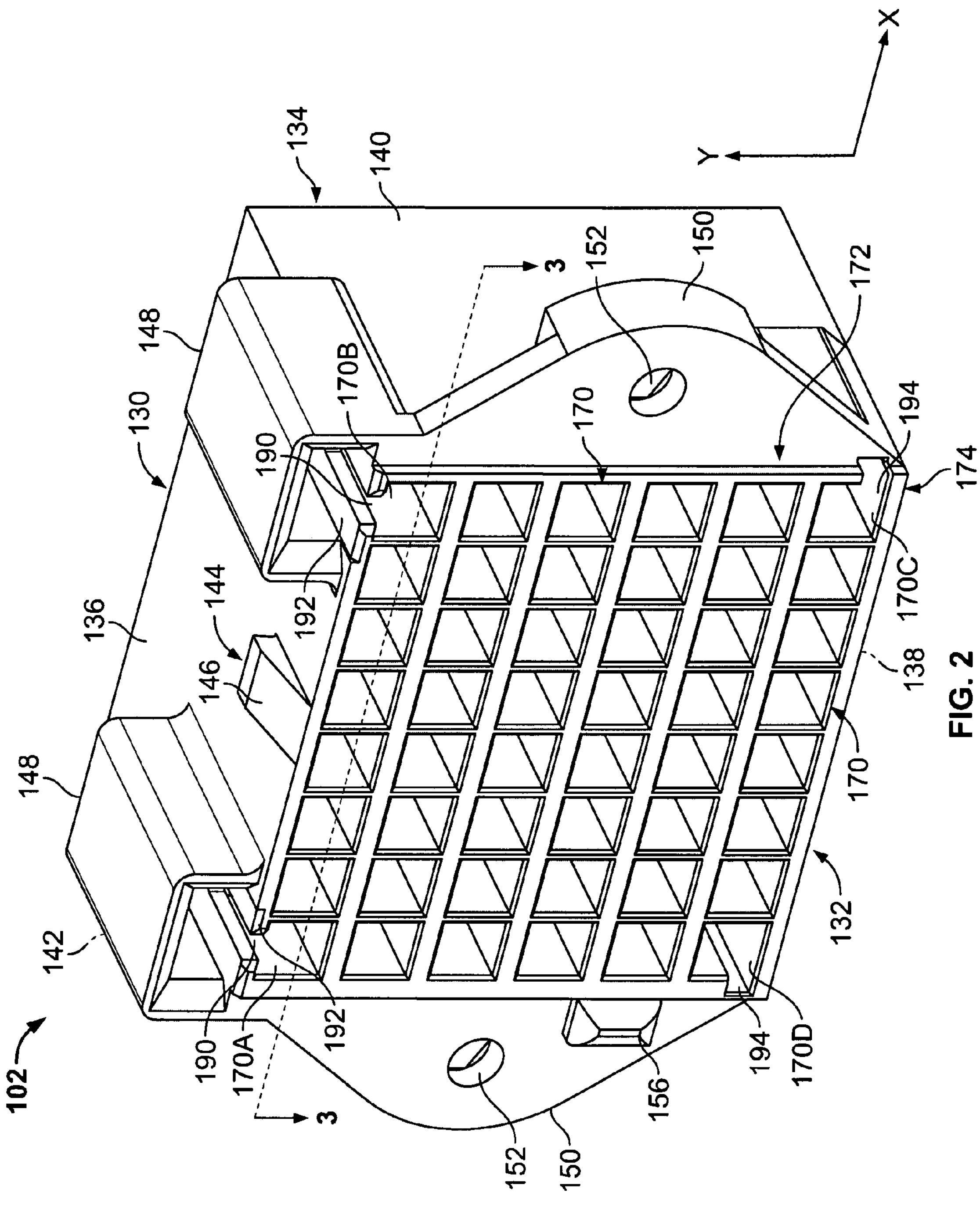
FIG. 2 is a perspective view of the plug connector shown in FIG. 1.

FIG. 2 illustrates a perspective view of the plug connector 102. The plug 102 includes a dielectric housing 130 having a forward mating end 132 and a rearward contact loading end 134. The housing 130 has a generally rectangular cross section and includes a top wall 136, an opposite bottom wall 138, and opposite first and second side walls 140 and 142, respectively. Latch elements 144, only one of which is visible in FIG. 2, are formed on the top wall 136 and bottom wall 138. The latch elements 144 may include ramped surfaces 146 tapering from the mating end 132. Guide receptacles 148 are also formed on the top wall 136. A mounting flange 150 is formed on and extends from each side wall 140 and 142 proximate the mating end 132. Each mounting flange 150 includes an aperture 152 sized to receive the fastener 112 for mounting the plug connector 102 to the panel 110 (FIG. 1). In one embodiment, the mounting flanges 150 may include a recess (not shown) facing the contact loading end 134 that is configured to receive the nut 114 to facilitate mounting of the plug connector 102 to the panel 110. A keying protrusion 156 is formed on one of the mounting flanges 150. The keying protrusion 156 is received in a cutout 160 (FIG. 1) in the panel 110 to orient the plug connector 102 with respect to the panel 110, or more particularly, with respect to a power supply chassis.

The housing 130 includes a plurality of contact cavities 170 arranged in a pattern including rows 172 parallel to the axis arrow X and columns 174 parallel to the axis arrow Y. The contact cavities 170 extend through the housing 130 from the mating end 132 to the contact loading end 134. The contact cavities 170 include polarizing contact cavities 170A, 170B, 170C, and 170D that are positioned and formed with polarization features that assure that the plug connector 102 and the mating receptacle connector 104 are properly oriented with respect to one another to allow the plug connector 102 and receptacle connector 104 to be mated. More particularly, the polarizing contact cavities 170A, 170B, 170C, and 170D define a receptacle connector 104 that is suitable to be mated with the plug connector 102. In the illustrated embodiment, the polarizing contact cavities 170A, 170B, 170C, and 170D are corner contact cavities. It is to be understood that in other embodiments, the plug connector 102 may be formed with more or fewer polarizing contact cavities 170A, 170B, 170C, and 170D which may be positioned at other locations in the housing 130. The upper corner contact cavities 170A and 170B include slots 190 formed in a contact cavity wall 192. In one embodiment, the slots 190 open into the guide receptacles 148. The slots 190 render the contact cavities 170A and 170B different from the remaining contact cavities 170 including the lower contact cavities 170C and 170D. Each of the lower corner contact cavities 170C and 170D includes a channel 194 that extends outwardly into the housing side walls 140 and 142 that imparts an L-shape to the lower contact cavities 170C and 170D. The lower corner contact cavities 170C and 170D are also different from the remaining contact cavities 170 including the upper corner contact cavities 170A and 170B. The receptacle connector 104 includes features complementary to those of the corner contact cavities 170A, 170B, 170C, and 170D as will be described.

Figure 3:
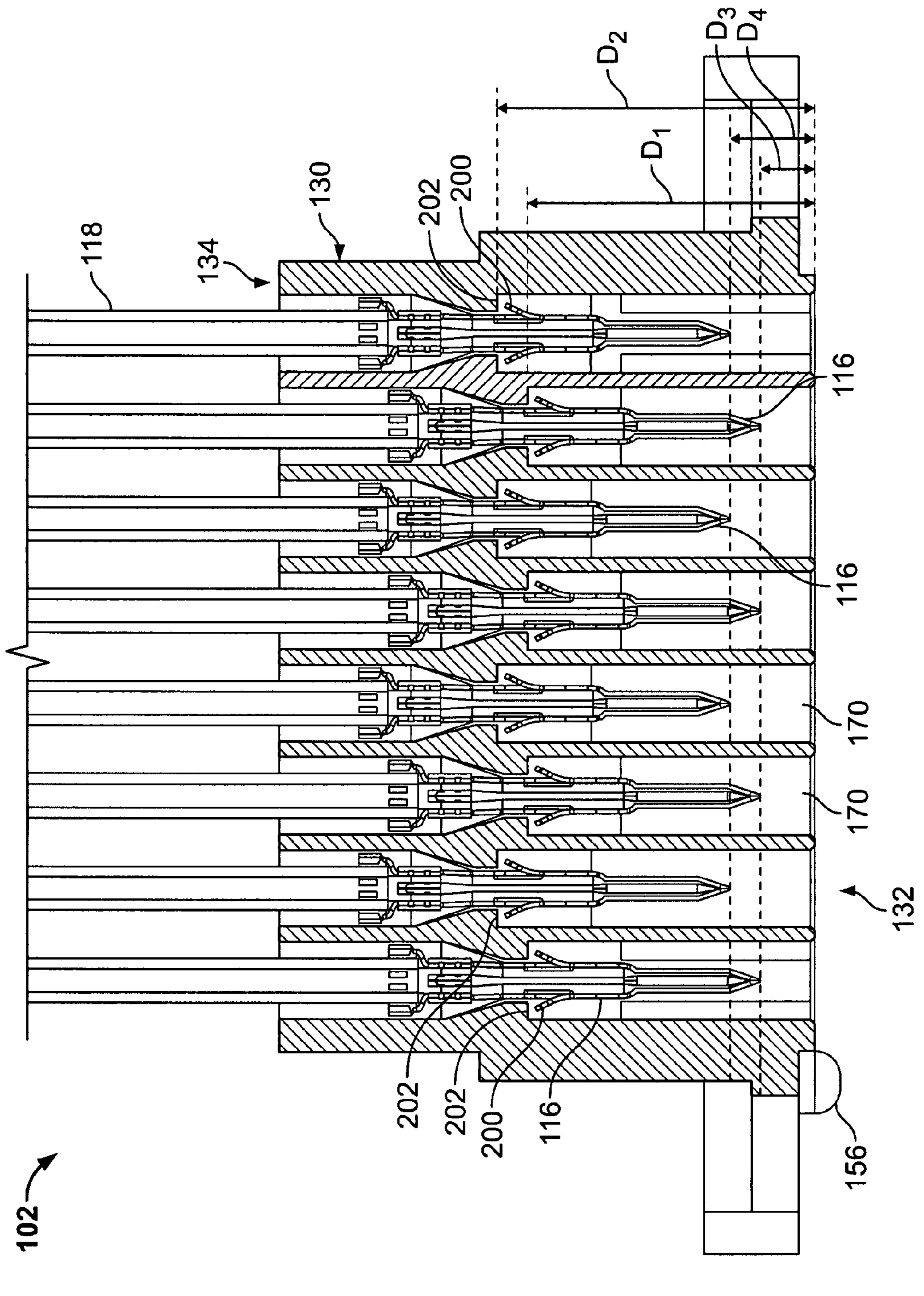
FIG. 3 is a cross sectional view of the plug connector taken along the line 3-3 in FIG. 2.

FIG. 3 illustrates a cross sectional view of a plug connector 102. Each contact cavity 170 is configured to receive a contact 116 (FIG. 1). However, in some embodiments, depending on requirements for a particular application, some of the contact cavities 170 may not include a contact 116 and thus are unused. The contacts 116 are terminated to the wires 118 using known techniques such as by crimping or soldering. After termination to the wires 118, the contacts 116 are loaded into the contact cavities 170 from the contact loading end 134 of the plug housing 130 in a manner that provides multiple voltage circuits in the plug housing 130. The contacts 116 include barbs 200 that engage ledges 202 in the contact cavities 170 to lock the contacts 116 in the contact cavities 170. Some of the ledges 202 are displaced a first distance $D_1$ from the mating end 132 while the remaining ledges 202 are displaced a second distance $D_2$ from the mating end 132 that is different from the first distance $D_1$ so that some of the contacts 116 have a first seating depth $D_3$ from the mating end 132 that is different from a seating depth $D_4$ of the remaining contacts 116. The variation in the seating depths $D_3$ and $D_4$ facilitates reducing the insertion force required when mating the plug connector 102 and the receptacle connector 104. In the illustrated embodiment, adjacent contacts 116 have different seating depths D3, D4. In other embodiments, seating depth may be varied by row or by column or by any other pattern. Further, in alternative embodiments, the plug connector 102 may be designed with more than two seating depths for the contacts 116.

Figure 4:
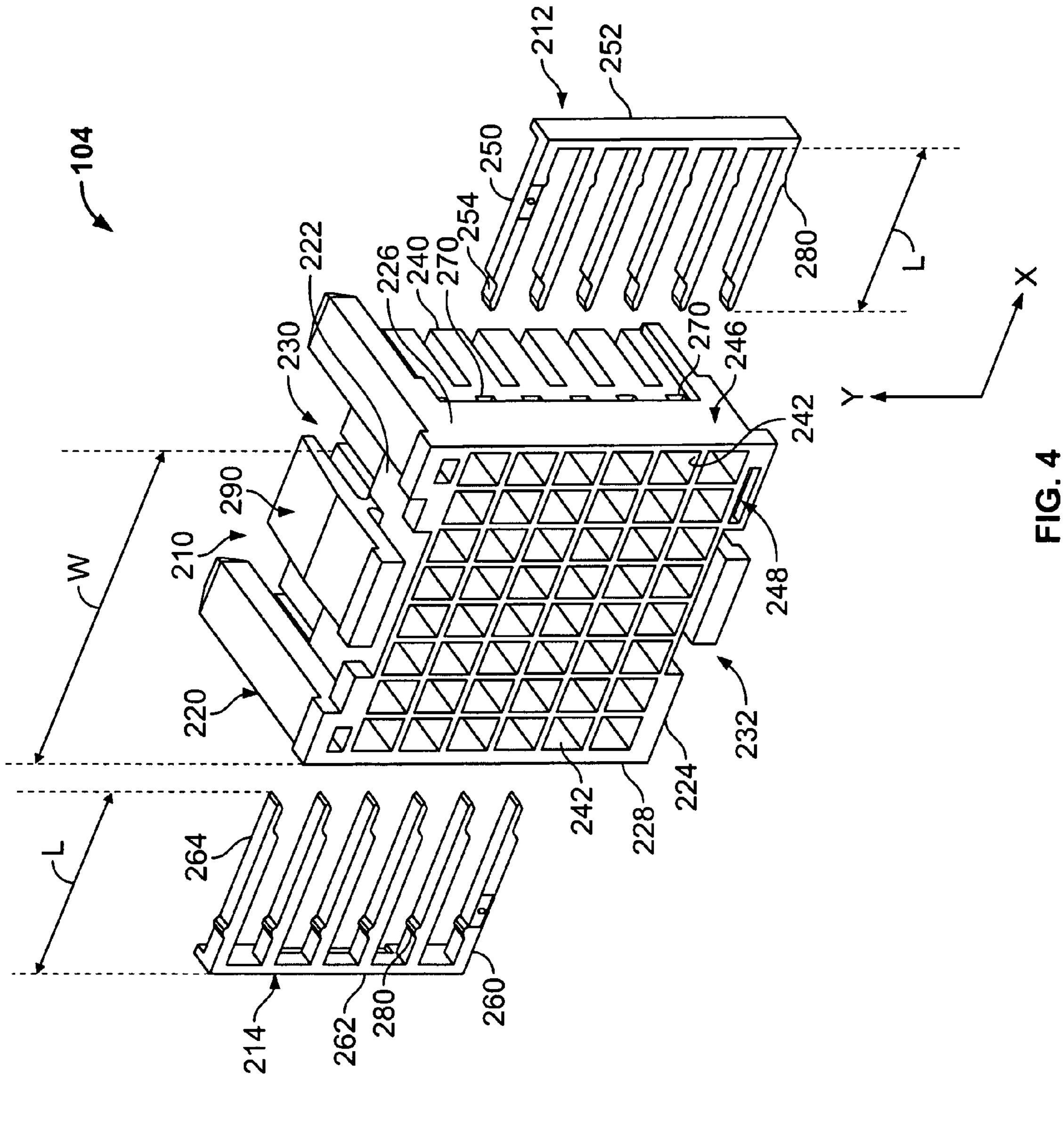
FIG. 4 is an exploded view of the receptacle connector shown in FIG. 1.

FIG. 4 illustrates an exploded view of the receptacle connector 104. The receptacle connector 104 includes a dielectric housing 210 and contact locking members 212 and 214. The housing 210 includes a body 220 having an upper end 222, a lower end 224, opposed sides 226 and 228 and has a forward mating end 230 and a rearward contact loading end 232. A plurality of contact holding silos 240 are formed at the mating end 230 of the housing 210. The housing 210 includes a plurality of contact cavities 242 arranged in a pattern including rows 246 parallel to the axis arrow X and columns 248 parallel to the axis arrow Y. The contact cavities 242 extend through the housing 210 from the contact loading end 232 and into and through respective ones of the silos 240 at the mating end 230.

Each contact cavity 242 is configured to receive a receptacle contact 122 (FIG. 1). As with the plug connector 102 (FIG. 2), in some embodiments, depending on requirements for a particular application, some of the contact cavities 242 may not include a contact 122 and may be unused. The contacts 122 are terminated to the wires 124 using known techniques such as by crimping or soldering. After termination to the wires 124, the contacts 122 are loaded into the contact cavities 242 from the contact loading end 232 of the receptacle housing 210. With the wiring in the plug connector 102 being known, the contacts 122 are loaded into contact cavities 242 selected to provide desired power levels based on the requirements for the electrical device (not shown). In this manner the need for a wiring harness in power supplies and electrical devices is eliminated.

Locking members 212 and 214 are provided to retain the receptacle contacts 122 (FIG. 1) in the housing 210. The locking member 212 includes a number of fingers 250 that extend from a connecting bar 252 and have distal ends 254. The fingers 250 have a length L from the connecting bar 252 to the distal ends 254 that is slightly longer than one half of a width W of the housing 210. The locking member 214 is similarly structured having fingers 260, a connecting bar 262, and distal ends 264. After the contacts 122 are loaded into the cavities 242, the fingers 250 of the locking member 212 are inserted into openings 270 in the side 226 of the housing 210. The openings 270 open into channels (not shown) that extend through the housing 210 to similar openings (not shown) in an opposite side 228 of the housing 210. The fingers 260 of the locking member 214 are inserted into the openings (not shown) in the opposite side 228 of the housing 210. The fingers 250, 260 are configured to engage shoulders or barbs (not shown) on the contacts 122 along contact cavity rows 246 to inhibit extraction of the contacts 122 from the housing 210. The fingers 250, 260 also assure that all of the contacts 122 are fully loaded into their respective cavities 242. The fingers 250 and 260 are oriented so that the distal ends 254 and 264 slightly overlap one another when the fingers 250, 260 are inserted fully into the openings 270 in the housing 210. Bumps 280 are formed on the fingers 250 and 260 to provide an interference or friction fit within the housing 210 when the fingers 250, 260 are inserted into the housing 210. In some embodiments, the locking members 212 and 214 may be replaced by a single locking member having fingers that extend the entire width W of the housing 210. However, the longer fingers may be expected to be somewhat less rigid and more flexible than the shorter fingers 250, 260.

Figure 5:
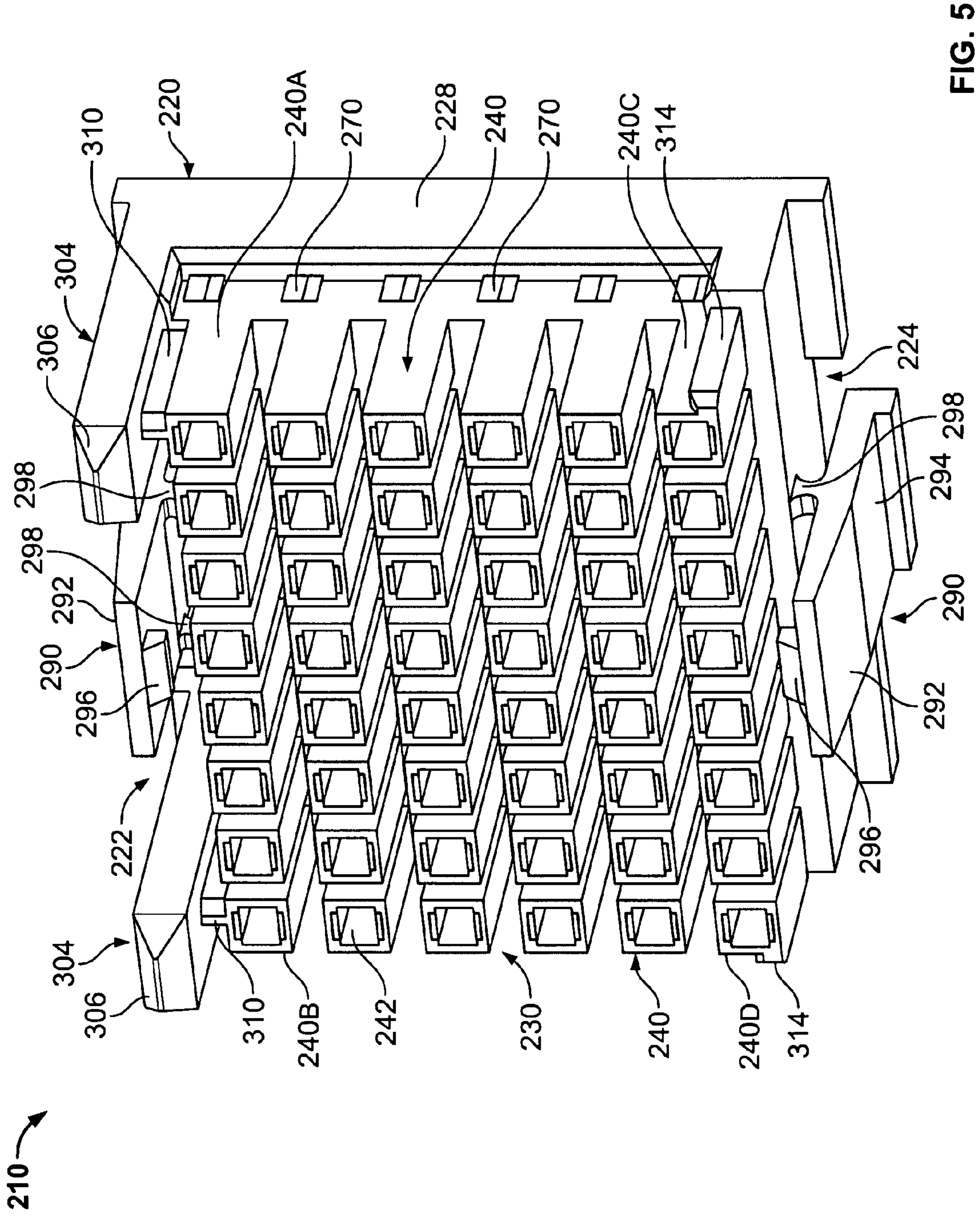
FIG. 5 is a bottom perspective view of the receptacle connector housing.

With renewed reference to FIG. 2 and continued reference to FIG. 4, FIG. 5 illustrates a bottom perspective view of the receptacle connector housing 210. Latching members 290 are molded and formed on the upper and lower ends 222 and 224, respectively, of the housing body 220. Each latching member 290 includes an engagement end 292 and an operating end that generally comprises a thumb pad 294. The engagement ends 292 include engagement members 296 formed thereon that engage the latch elements 144 on the plug housing 130 to retain the plug 102 and the receptacle 104 in mating engagement when the plug connector 102 and receptacle connector 104 are joined to one another. The latching members 290 are pivotably joined to the housing body 220 by living hinges 298 that facilitate pivoting of the engagement ends 292 and the thumb pads 294 about the living hinges 298 in response to pressure applied to the thumb pads 294 or in response to reaction forces from the ramped surfaces 146 on the latch elements 144 while the plug connector 102 and receptacle connector 104 are being mated.

Guide posts 304 are formed on the upper end 222 of the housing body 220. The guide posts 304 are complementary in shape to and are received in the guide receptacles 148 on the plug connector 102. The guide posts 304 protrude furthest from the mating end 230 of the receptacle connector 104 and thus the guide posts 304 are the first to engage the plug connector 102 when the plug connector 102 and the receptacle connector 104 are mated. The guide posts 304 thereby facilitate blind mating of the plug and receptacle connectors 102 and 104 and also assure that the plug and receptacle connectors 102 and 104 are correctly oriented with respect to one another. In an exemplary embodiment, the guide posts include tapered ends 306 that further facilitate blind mating of the plug and receptacle connectors 102 and 104.

The silos 240 extend from the body 220 to form the mating end 230 of the housing 210 and are sized to be received in the contact cavities 170 of the plug connector 102. The silos 240 include upper corner silos 240A and 240B and lower corner silos 240C and 240D. The upper corner silos 240A and 240B are formed with ridges 310 that extend upwardly and join the guide posts 304 that are positioned above the upper corner silos 240A and 240B. The ridges 310 are received in the slots 190 in the upper corner contact cavities 170A and 170B in the plug connector 102 when the plug and receptacle connectors 102 and 104 are mated. The lower corner silos 240C and 240D are formed with side walls having outwardly extending protrusions 314 that are received in the channels 194 in the lower contact cavities 170C and 170D in the plug connector 102 when the plug and receptacle connectors 102 and 104 are mated. The ridges 310 at the upper corner silos 240A and 240B along with the protrusions 314 formed on the lower corner silos 240C and 240D comprise features that assure that the receptacle connector 104 is the correct size and is suitable to be mated with the plug connector 102. Additionally, the ridges 310 and the protrusions 314 comprise polarization features that assure that the plug and receptacle connectors 102 and 104 that are about to be mated are correctly oriented so that damage to the electrical system to and/or the power supply is avoided.

Figure 6:
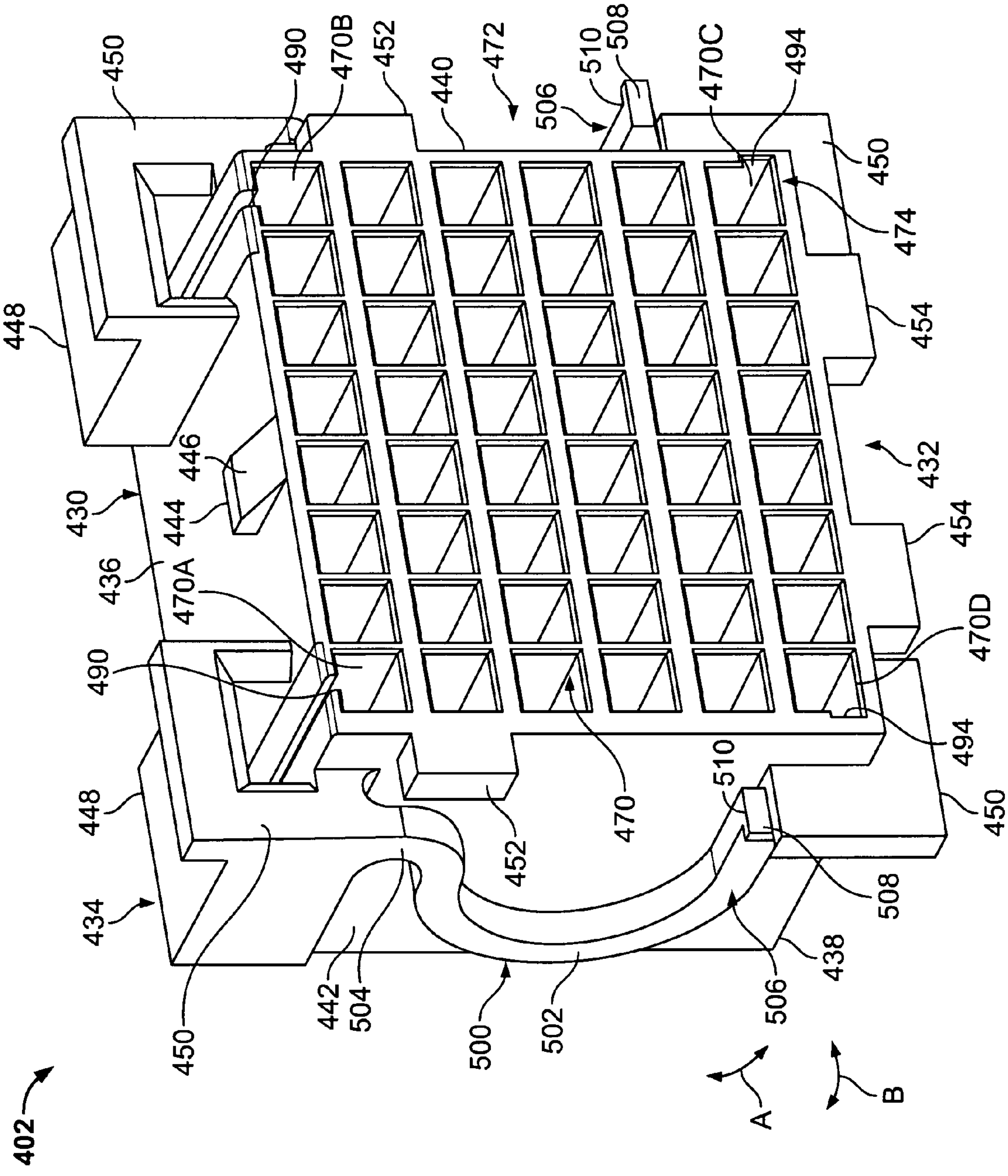
FIG. 6 is a perspective view of the plug connector formed in accordance with an alternative embodiment of the present invention.
Figure 7:
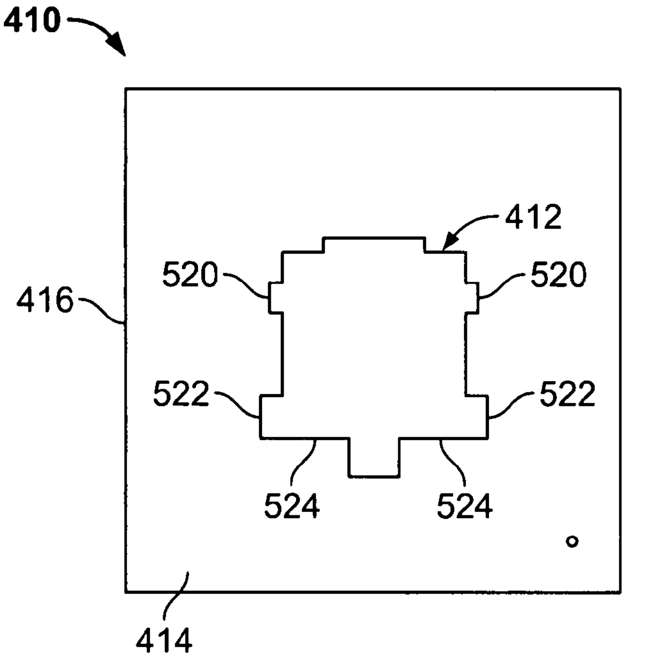
FIG. 7 is a front elevational view of a panel including a cutout sized to receive the plug connector shown in FIG. 6.

FIG. 6 illustrates a perspective view of a plug connector 402 formed in accordance with an alternative embodiment of the present invention. FIG. 7 illustrates a front elevational view of a panel or chassis 410 including a cutout 412 sized to receive the plug connector 402. The panel has a front or forward side 414 and a rearward side 416. The plug connector 402 is configured for slide-to-lock mounting in the panel 410 without fasteners or special tools. The plug connector 402 is electrically identical to the plug connector 102 (FIG. 2) previously described and is configured for use with the receptacle connector 104 (FIG. 4) also previously described.

The plug connector 402 includes a dielectric housing 430 having a forward mating end 432 and a rearward contact loading end 434. The housing 430 has a generally rectangular cross section and includes a top wall 436, an opposite bottom wall 438, and opposite first and second side walls 440 and 442, respectively. Latch elements 444, only one of which is visible in FIG. 6, are formed on the top wall 436 and bottom wall 438. The latch elements 444 may include ramped surfaces 446 tapering from the mating end 432. Guide receptacles 448 are also formed on the top wall 436. The housing 430 is formed with flanges 450 that are configured to engage a rearward side of the panel 410 when the plug connector 402 is mounted in the panel 410. Upper tabs 452 and lower tabs 454 extend through the panel 410 and engage a forward side of the panel 410 when the plug connector 402 is mounted in the panel 410.

The housing 430 includes a plurality of contact cavities 470 arranged in a pattern including rows 472 parallel to the axis arrow X and columns 474 parallel to the axis arrow Y. The contact cavities 470 extend through the housing 430 from the mating end 432 to the contact loading end 434. The contact cavities 470 include corner contact cavities 470A, 470B, 470C, and 470D that are formed with polarization features that assure that the plug connector 402 and the mating receptacle connector 104 (FIG. 4) are properly oriented with respect to one another to allow the plug connector 402 and receptacle connector 104 to be mated. The upper corner contact cavities 470A and 470B are formed with slots 490 that open into the guide receptacles 448. The slots 490 render the contact cavities 470A and 470B different from the remaining contact cavities 470 including the lower contact cavities 470C and 470D. Each of the lower corner contact cavities 470C and 470D includes a channel 494 that extends outwardly into the housing side walls 440 and 442 that imparts an L-shape to the lower contact cavities 470C and 470D. The lower corner contact cavities 470C and 470D are also different from the remaining contact cavities 470 including the upper corner contact cavities 470A and 470B.

The plug connector 402 includes deflectable latches 500 proximate each side wall 440 and 442. Each latch 500 includes a latch arm 502 having a fixed pivot end 504 attached to the housing 430 and a latch end 506. The latch end 506 has a front face 508 and an outwardly extending lip 510. The latch end 506 is pivotable about the pivot end 504 in a generally curved path in the direction of the arrow A. The latch end 506 is also deflectable sideward in a generally curved path in the direction of the arrow B. In one embodiment, the latch arms 502 have a generally C-shape. However, in other embodiments, the latch arms 502 may be formed with other shapes. More particularly, the curved shape of the latch arms 502 provides a latch arm with a longer overall length which adds flexibility to the latch arms 502. The deflectable latches 500 enable slide-to-lock mounting of the plug connector 402 as will be described.

Figure 8:
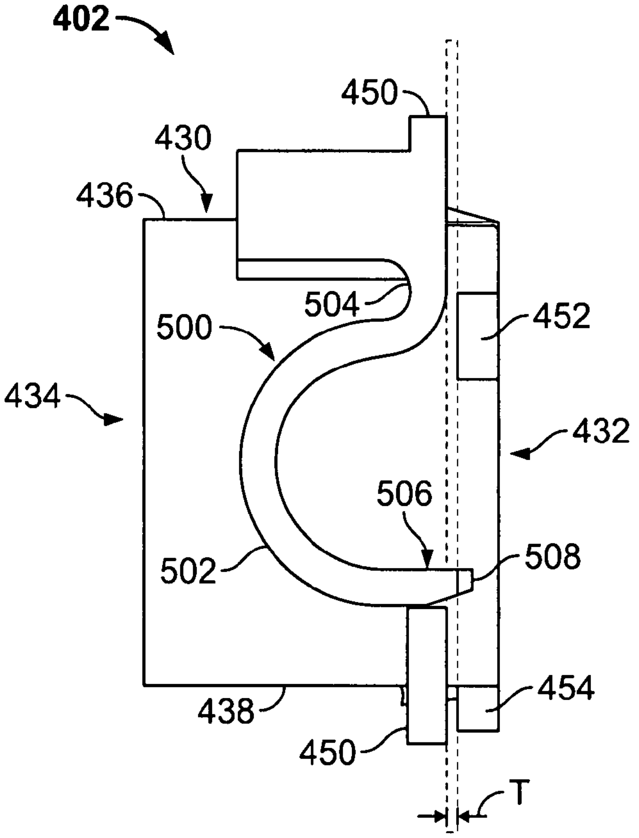
FIG. 8 is a side view of the plug connector shown in FIG. 6.
Figure 9:
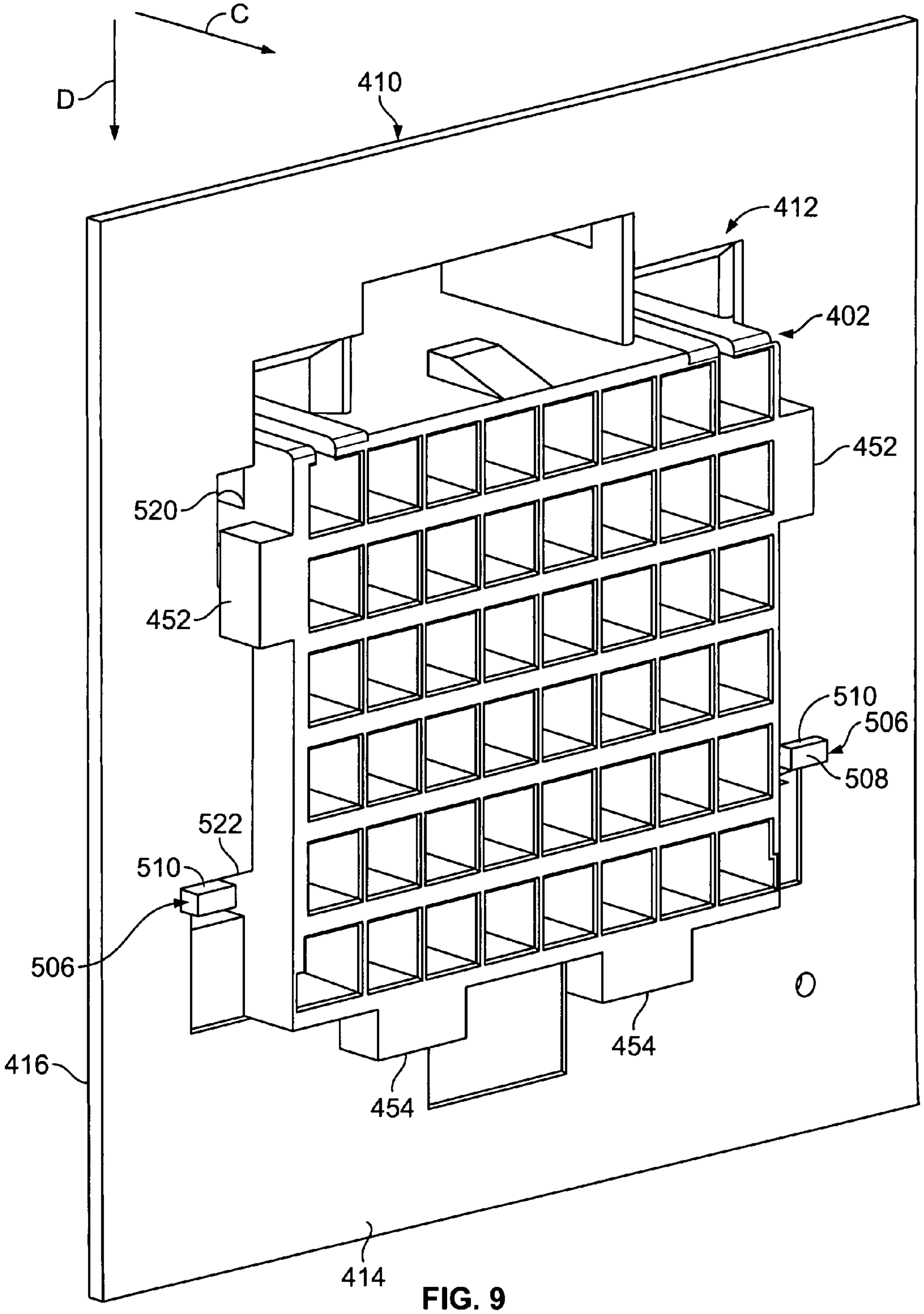
FIG. 9 illustrates a perspective view of a plug connector in a locked position in a panel.

With continued reference to FIG. 7, FIG. 8 illustrates a side view of the plug connector 402. FIG. 9 illustrates a perspective view of the plug connector 402 in a locked position in the panel 410. The upper and lower tabs 452 and 454, respectively, are offset forwardly from the flanges 450 by a distance T that corresponds to a thickness of the panel 410. The latch arms 502 are formed such that the front face 508 and lip 510 on the latch end 506 are biased in a position forward of the front side 414 of the panel 410. When mounted in the panel 410, the mating end 432 of the plug connector 402 extends forwardly beyond the front side 414 of the panel 410.

The plug connector 402 is mounted in the panel 410 by inserting the housing 430 into the cutout 412 from the rearward side 416 of the panel 410 in the direction of the arrow C with the upper tabs 452 passing through notches 520 in the panel 410. In this intermediate position, the flanges 450 and the front faces 508 on the latch ends 506 are brought into engagement with the rearward side 416 of the panel 410. The housing 430 is then moved to a locked position by sliding the housing 430 downwardly in the direction of the arrow D, perpendicular to the direction of the arrow C, while pressing inwardly on the latch ends 506 until the latch ends 506 snap into lower notches 522 in the panel 410 and the bottom wall 438 engages lower edges 524 of the cutout 412. When the latch ends 506 are released, the latch ends 506 spring outwardly to engage the notches 522 with the lip 510 resting against the front side 414 of the panel 410. The procedure is reversed to remove the plug connector 402.

The embodiments thus described provide a power connector assembly 100 that eliminates the need for wiring harnesses in power supplies and in electrical devices. One connector 102 in the assembly is mountable to a panel or chassis inside the power supply and the other connector 104 may be selectively wired to meet the power requirements for the device. The assembly 100 may be easily mated and includes features that assure that the plug and receptacle connectors 102 and 104 that are about to be mated are of the correct size and are correctly oriented so that damage to the electrical system to and/or the power supply is avoided. The connector assembly 100 also includes guide posts 304 and guide receptacles 148 that cooperate to facilitate blind mating of the connectors 102 and 104. Further, the plug connector 102 is provided with contacts 116 loaded in the connector housing 130 in a staggered manner to reduce force required to mate the connectors 102 and 104. The plug connector may also be provided in a slide-to-lock version 402 that facilitates convenient slide-to-lock mounting of the plug connector to a panel 410.

While the invention has been described in terms of various specific embodiments, those skilled in the art will recognize that the invention can be practiced with modification within the spirit and scope of the claims.

What is claimed is:

1. An electrical connector mountable to a panel, said connector comprising:

a dielectric housing having a plurality of contact cavities extending from a mating end to a contact loading end and arranged in rows and columns, at least one of said plurality of contact cavities comprising a polarizing contact cavity positioned and formed to orient the electrical connector with respect to a mating connector to permit the electrical and mating connectors to mate with one another.

2. The electrical connector of claim 1, wherein said polarizing contact cavity is a corner contact cavity and includes a contact cavity wall having a slot formed therein, said slot configured to receive a ridge on the mating connector.

3. The electrical connector of claim 1, wherein said polarizing contact cavity is a corner contact cavity and includes a contact cavity wall having a channel that extends into a side wall of said housing, said channel configured to receive a protrusion on the mating connector.

4. The electrical connector of claim 1, further comprising contacts loaded into said contact cavities, wherein some of said contacts are positioned at a first seating depth from said mating end and others of said contacts are positioned at a second seating depth from said mating end that is different from said first seating depth.

5. The electrical connector of claim 1, wherein said housing includes a mounting flange having an aperture sized to receive a fastener to mount the electrical connector to the panel.

6. The electrical connector of claim 1, wherein said housing includes a mounting flange having a keying protrusion formed thereon to orient the electrical connector with respect to the panel.

7. The electrical connector of claim 1, wherein said housing includes a deflectable latch having a fixed pivot end and a latch end, said latch end configured to engage a cutout in the panel to retain the electrical connector in the cutout in the panel.

8. The electrical connector of claim 7, wherein the electrical connector is configured to be inserted into the cutout in a first direction and slid in a second direction perpendicular to the first direction to lock the electrical connector in the panel.

9. The electrical connector of claim 1, wherein said housing includes a guide receptacle that is configured to receive a guide post on the mating connector to facilitate blind mating with the mating connector.

10. The electrical connector of claim 9, wherein said polarizing contact cavity is a corner contact cavity and includes a contact cavity wall having a slot formed therein that opens into said guide receptacle.

11. A connector assembly comprising:

a first connector configured to be mounted to a panel, said connector comprising a housing having a plurality of contact cavities extending from a mating end to a contact loading end and arranged in rows and columns; and a second connector matable to said first connector, said second connector comprising a housing including a plurality of silos each having a contact cavity extending from a mating end to a contact loading end, each silo being configured to be received in a respective one of said contact cavities in said first connector, and wherein at least one of said plurality of contact cavities in said first connector comprises a polarizing contact cavity configured to receive a complementary silo on said second connector to orient said first connector with respect to said second connector.

12. The connector assembly of claim 11, wherein said second connector includes a locking member received in said housing of said second connector, wherein said locking member engages contacts in said housing to inhibit extraction of said contacts from said housing.

13. The connector assembly of claim 11, wherein said housing of said first connector includes a guide receptacle and said polarizing contact cavity includes a contact cavity wall having a slot therein that opens into said guide receptacle and said second connector housing includes a guide post and a ridge formed between said guide post and one of said silos, and wherein said ridge is received in said slot when said first and second connectors are mated with one another.

14. The connector assembly of claim 11, wherein said polarizing contact cavity is a corner contact cavity and includes a contact cavity wall having a channel that extends into a side wall of said housing, and one of said silos includes a protrusion that is received in said channel when said first and second connectors are mated with one another.

15. The connector assembly of claim 11, wherein said housing of said first connector includes a guide receptacle and said housing of said second connector includes a guide post configured to be received in said guide receptacle, said guide post including a tapered end to facilitate blind mating of said first and second connectors.

16. The connector assembly of claim 11, wherein said first connector further comprises contacts loaded into said contact cavities, wherein some of said contacts are positioned at a first seating depth from said mating end and others of said contacts are positioned at a second seating depth from said mating end that is different from said first seating depth.

17. The connector assembly of claim 11, wherein said housing of said first connector includes a latch element and said hosing of said second connector includes a latching member that engages said latch element to retain said first and second connectors in a mated condition.

18. The connector assembly of claim 11, wherein said housing of said first connector includes a deflectable latch having a fixed pivot end and a latch end, said latch end configured to engage a cutout in the panel to retain said first connector in the cutout in the panel.

19. The connector assembly of claim 18, wherein said first connector is configured to be inserted into the cutout in a first direction and slid in a second direction perpendicular to the first direction to lock said connector in the panel.

20. The connector assembly of claim 11, wherein said housing of said first connector includes a mounting flange having a keying protrusion formed thereon to orient said connector with respect to the panel.

* * * * *